US006921246B2

(12) United States Patent
Brainch et al.

(10) Patent No.: US 6,921,246 B2
(45) Date of Patent: Jul. 26, 2005

(54) METHODS AND APPARATUS FOR ASSEMBLING GAS TURBINE NOZZLES

(75) Inventors: Gulcharan S. Brainch, West Chester, OH (US); William Miller, Fairfield, OH (US); Richard W. Albrecht, Fairfield, OH (US); David B. Stewart, Cincinnati, OH (US); Todd Stephen Heffron, Harrison, OH (US)

(73) Assignee: General Electric Company, Schenectady, NY (US)

( * ) Notice: Subject to any disclaimer, the term of this patent is extended or adjusted under 35 U.S.C. 154(b) by 272 days.

(21) Appl. No.: 10/325,035

(22) Filed: Dec. 20, 2002

(65) Prior Publication Data

US 2004/0120810 A1 Jun. 24, 2004

(51) Int. Cl.⁷ ................................................. F01D 9/04
(52) U.S. Cl. .................. 415/191; 415/209.4; 415/210.1
(58) Field of Search .............................. 415/191, 209.3, 415/209.4, 210.1, 208.1, 208.2

(56) References Cited

U.S. PATENT DOCUMENTS

| 4,126,405 A | 11/1978 | Bobo |
| 4,297,077 A | 10/1981 | Durgin et al. |
| 4,522,054 A | 6/1985 | Wilson et al. |
| 4,531,289 A | 7/1985 | Brick |
| 4,732,029 A | 3/1988 | Bertino |
| 4,842,249 A | 6/1989 | Weigand |
| 4,869,465 A | 9/1989 | Yirmiyahu et al. |
| 5,243,761 A | 9/1993 | Sullivan et al. |
| 5,249,920 A | 10/1993 | Shepherd et al. |
| 5,289,711 A | 3/1994 | Spiegel |
| 5,372,476 A | 12/1994 | Hemmelgarn et al. |
| 5,425,260 A | 6/1995 | Gehron |
| 5,620,300 A | 4/1997 | Knujit |
| 5,662,160 A | 9/1997 | Correia et al. |
| 5,669,757 A | 9/1997 | Brackett |
| 5,673,898 A | 10/1997 | Michalo |
| 5,732,932 A | 3/1998 | Michalo |
| 5,810,333 A | 9/1998 | Hickerson et al. |
| 5,848,854 A | 12/1998 | Brackett |
| 5,875,554 A | 3/1999 | Vogelsanger |
| 5,953,822 A | 9/1999 | Vogelsanger |
| 6,099,245 A | 8/2000 | Bunker |
| 6,164,656 A | 12/2000 | Frost |
| 6,183,192 B1 * | 2/2001 | Tressler et al. .......... 415/209.3 |
| 6,193,465 B1 | 2/2001 | Liotta et al. |
| 6,272,900 B1 | 8/2001 | Kobel |
| 6,311,537 B1 | 11/2001 | Vigil |

* cited by examiner

*Primary Examiner*—Edward K. Look
*Assistant Examiner*—Richard A. Edgar
(74) *Attorney, Agent, or Firm*—William Scott Andes; Armstrong Teasdale LLP

(57) ABSTRACT

A method facilitates assembling a turbine nozzle for a gas turbine engine. The method includes providing a turbine nozzle including a plurality of airfoil vanes that extend between an inner band and an outer band, and forming a compound radii fillet that extends between a first of the airfoil vanes and the outer band, such that at least a second of the airfoil vanes is coupled to the outer band only by a single radii fillet.

20 Claims, 4 Drawing Sheets

METHODS AND APPARATUS FOR ASSEMBLING GAS TURBINE NOZZLES

BACKGROUND OF THE INVENTION

This invention relates generally to gas turbine engine nozzles and more particularly, to methods and apparatus for assembling gas turbine engine nozzles.

Gas turbine engines include combustors which ignite fuel-air mixtures which are then channeled through a turbine nozzle assembly towards a turbine. At least some known turbine nozzle assemblies include a plurality of nozzles arranged circumferentially and configured as doublets. At least some known turbine nozzles include more than two circumferentially-spaced hollow airfoil vanes coupled by integrally-formed inner and outer band platforms. More specifically, the inner band forms a radially inner flowpath boundary and the outer band forms a radially outer flowpath boundary. Other known turbine nozzles are mounted in a cantilever arrangement wherein the inner band is moveable radailly and axially, and the outer band is constrained at forward and aft hooks.

Forming the turbine nozzle with greater than two integrally-formed airfoil vanes facilitates improving durability and reducing leakage in comparison to turbine nozzles which include only one or two airfoil vanes. Accordingly, at least some known turbine nozzles include at least one airfoil vane positioned between a pair of circumferentially outer airfoil vanes. However, during operation, temperature gradients and aerodynamic loading may result in thermal stresses and thermal chording at an interface between the airfoil vanes and the outer band. More specifically, higher stresses may be induced into the outer airfoil vanes than the vanes positioned between the outer airfoil vanes. Over time, the local stresses induced to the turbine nozzle may cause premature failure of the turbine nozzle.

To facilitate reducing the effects of thermal gradients and aerodynamic loading, within at least some known turbine nozzles, a compound radii fillet is formed between each airfoil vane and the outer band. However, because at least some known turbine nozzles are designed with low aerodynamic convergence to permit an easy passage for airfoil cooling and to pass cooling and purge air for the high pressure turbine/low pressure turbine rotor cavities. Thus, extending compound radii fillets along the airfoil vanes may undesirably reduce aerodynamic convergence through the turbine nozzle. Furthermore, in extreme circumstances, the reduced aerodynamic convergence may cause the nozzle aerodynamic throat to shift forward from the nozzle trailing edge, thus resulting in an unstable aerodynamic environment.

BRIEF SUMMARY OF THE INVENTION

In one aspect, a method for assembling a turbine nozzle for a gas turbine engine is provided. The method comprises providing a turbine nozzle including a plurality of airfoil vanes extending between an inner band and an outer band, and forming a compound radii fillet extending between a first of the airfoil vanes and the outer band and such that at least a second of the airfoil vanes is coupled to the outer band by a single radii fillet.

In another aspect of the invention, a turbine nozzle for a gas turbine engine is provided. The nozzle includes an outer band, an inner band, and a plurality of airfoil vanes that are coupled together by the outer band and the inner bands. The plurality of airfoil vanes include at least a first airfoil vane and a second airfoil vane. The first airfoil vane includes a compound radii fillet that extends between the outer band and the first airfoil vane. The second airfoil vane is coupled to the outer band only by a single radii fillet.

In a further aspect, a gas turbine engine includes at least one turbine nozzle assembly that includes an outer band, an inner band, and a plurality of airfoil vanes coupled together by the outer and inner bands. The plurality of airfoil vanes include a first airfoil vane and a second airfoil vane positioned circumferentially adjacent the first airfoil vane. The first airfoil vane includes at least one compound radii fillet that extends between the first airfoil vane and the outer band. The second airfoil vane comprises only a single compound fillet extending between the outer band and the second airfoil vane.

DETAILED DESCRIPTION OF THE INVENTION

Figure 1:
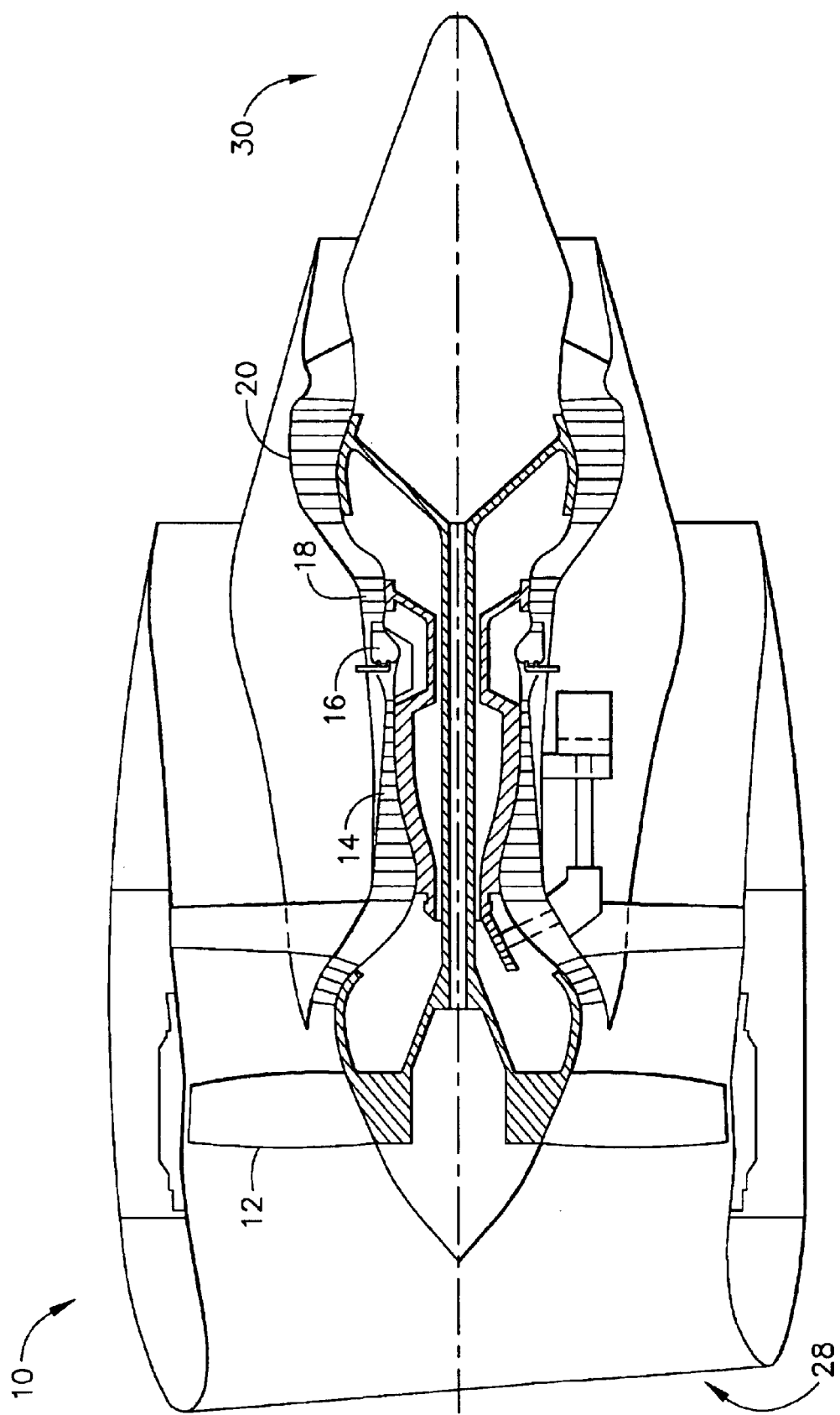
FIG. 1 is a schematic illustration of a gas turbine engine.

FIG. 1 is a schematic illustration of a gas turbine engine 10 including a fan assembly 12, a high-pressure compressor 14, and a combustor 16. Engine 10 also includes a high-pressure turbine 18 and a low-pressure turbine 20. Engine 10 has an intake side 28 and an exhaust side 30. In one embodiment, engine 10 is a CF-34-10 engine commercially available from General Electric Aircraft Engines, Cincinnati, Ohio.

In operation, air flows through fan assembly 12 and compressed air is supplied to high-pressure compressor 14. The highly compressed air is delivered to combustor 16. Airflow from combustor 16 drives turbines 18 and 20, and turbine 20 drives fan assembly 12. Turbine 18 drives high-pressure compressor 14.

Figure 2:
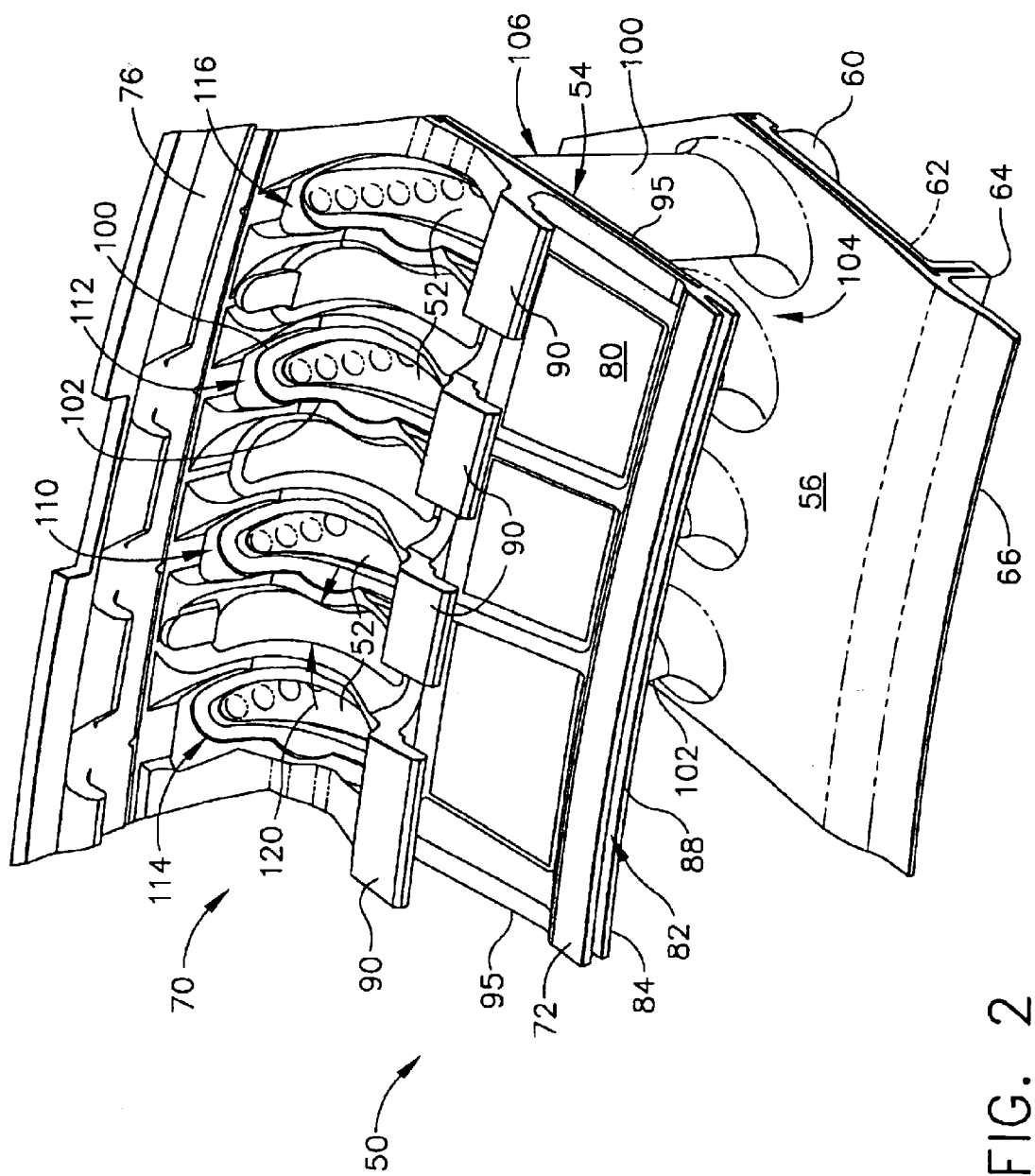
FIG. 2 is a perspective view of a turbine nozzle that may be used with the gas turbine engine shown in FIG. 1.
Figure 3:
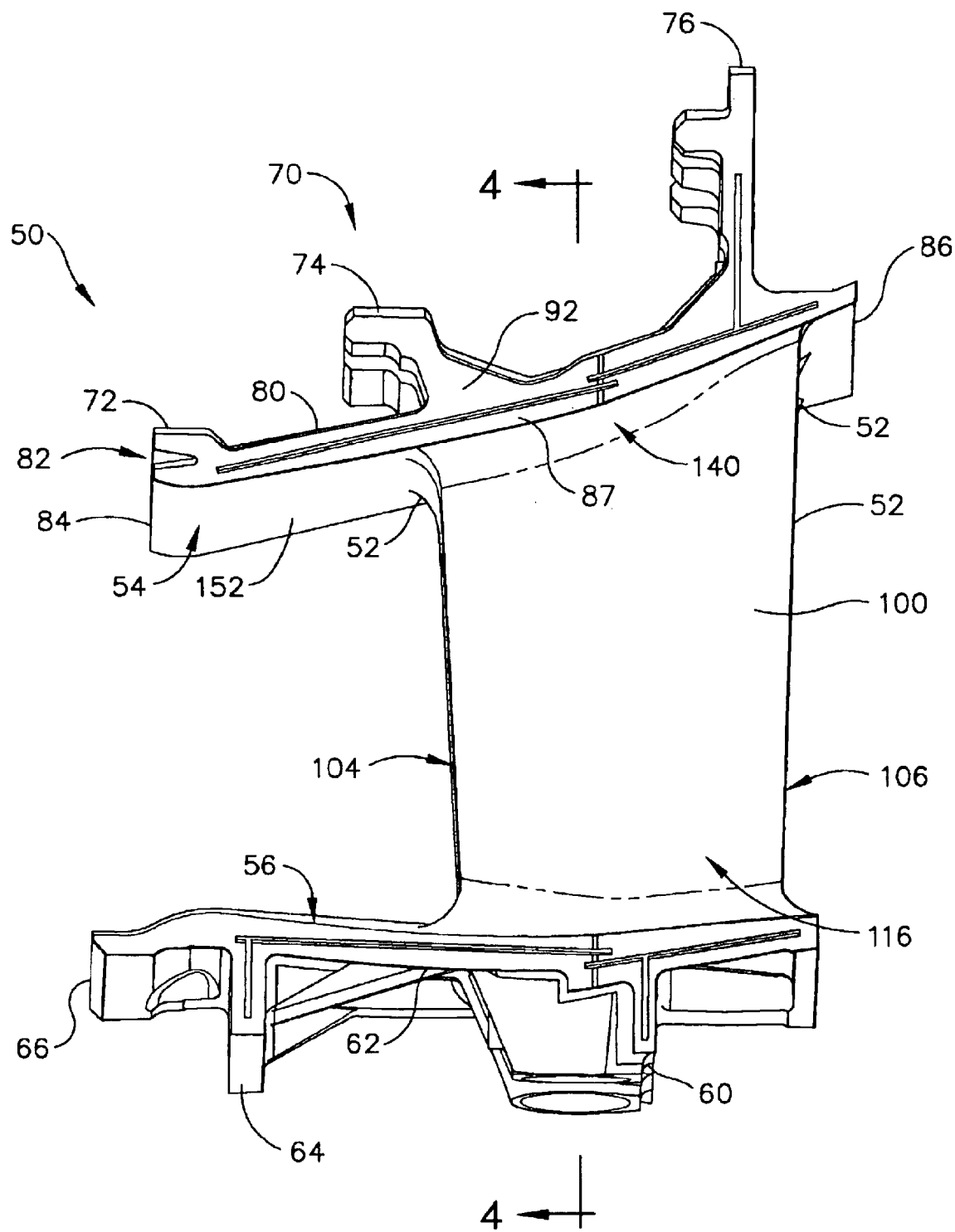
FIG. 3 is a side perspective view of the turbine nozzle shown in FIG. 2.
Figure 4:
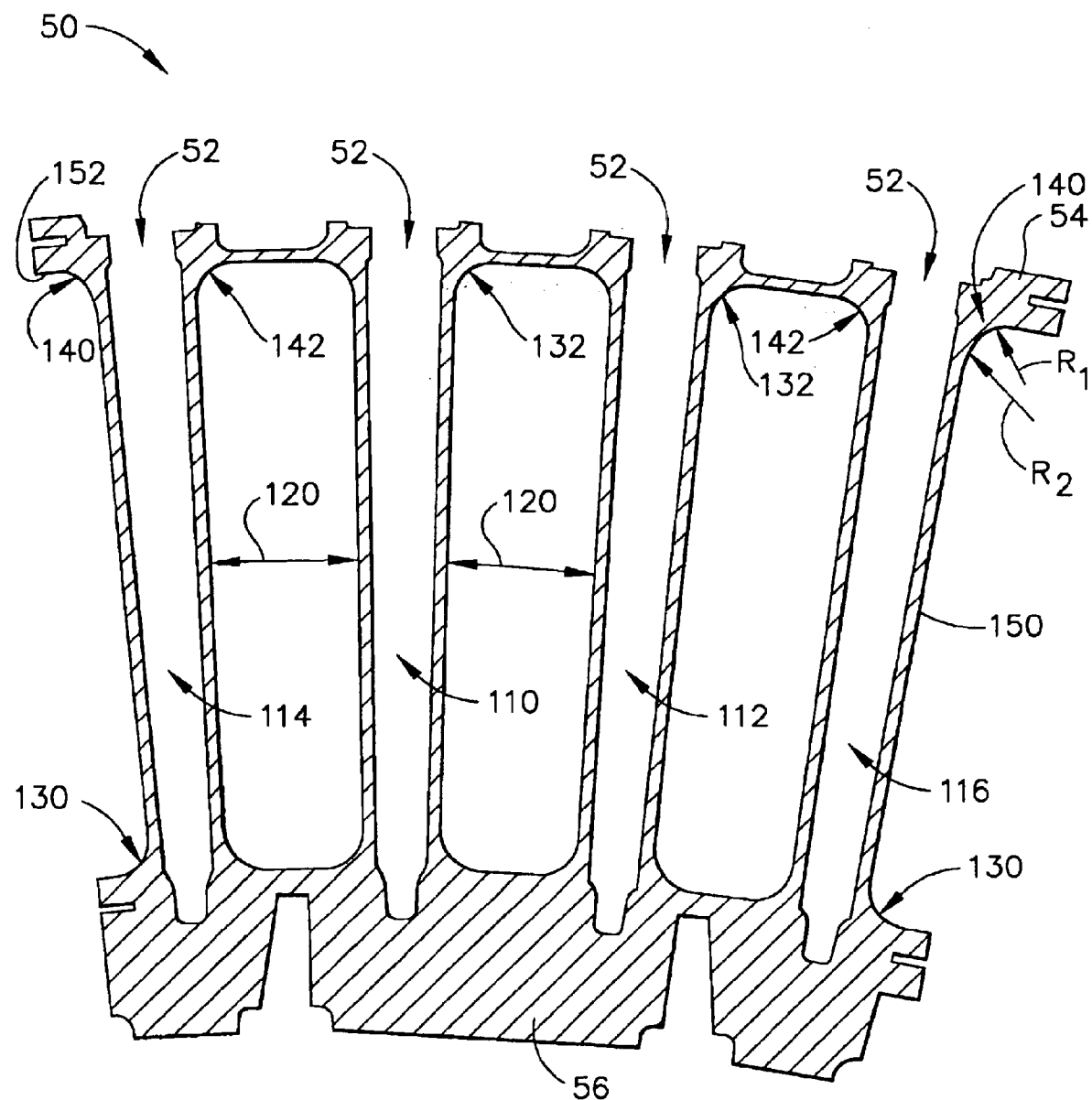
FIG. 4 is a cross sectional view of the turbine nozzle shown in FIG. 3 and taken along line 4—4.

FIG. 2 is a perspective view of a turbine nozzle 50 that may be used with gas turbine engine 10 (shown in FIG. 1). FIG. 3 is a side perspective view of turbine nozzle 50. FIG. 4 is a cross sectional view of turbine nozzle 50 taken along taken along line 4—4 (shown in FIG. 3). Nozzle 50 includes a plurality of circumferentially-spaced airfoil vanes 52 coupled together by an arcuate radially outer band or platform 54 and an arcuate radially inner band or platform 56. More specifically, in the exemplary embodiment, each band 54 and 56 is integrally-formed with airfoil vanes 52, and nozzle 50 includes four airfoil vanes 52. In one embodiment, each arcuate nozzle 50 is known as a four vane segment. In an alternative embodiment, nozzle vanes 52 are mounted in a cantilever arrangement within nozzle 50.

Inner band 56 includes an aft flange 60 that extends radially inwardly therefrom. More specifically, flange 60 extends radially outwardly from band 56 with respect to a radially inner surface 62 of band 56. Inner band 56 also includes a forward flange 64 that extends radially inwardly therefrom. Forward flange 64 is positioned between an upstream edge 66 of inner band 56 and aft flange 60. In the exemplary embodiment, flange 64 extends radially outwardly from band 56.

Outer band 54 includes a cantilever mounting system 70 that includes a forward retainer 72, a mid hook assembly 74, and an aft hook assembly 76. Cantilever mounting system 70 facilitates supporting turbine nozzle 50 within engine 10 from a surrounding annular engine casing (not shown). Forward retainer 72 extends radially outwardly from an outer surface 80 of outer band 54 and defines a channel 82 that extends continuously in a circumferential direction across a leading edge 84 of outer band 54.

Mid hook assembly 74 is positioned aft of forward retainer 72 and in the exemplary embodiment, includes a plurality of circumferentially-spaced and circumferentially-aligned hooks 90. Alternatively, mid hook assembly 74 extends continuously across outer band outer surface 80.

Aft hook assembly 76 is positioned aft of mid hook assembly 74, and as such is between a trailing edge 92 of nozzle 50 and mid hook assembly 74. In the exemplary embodiment, hook assembly 76 extends continuously in a circumferential direction across outer band outer surface 80 and is substantially parallel to mid hook assembly 74.

Airfoil vanes 52 are substantially similar and each includes a first sidewall 100 and a second sidewall 102. First sidewall 100 is convex and defines a suction side of each airfoil 52, and second sidewall 102 is concave and defines a pressure side of each airfoil vane 52. Sidewalls 100 and 102 are joined at a leading edge 104 and at an axially-spaced trailing edge 106 of each airfoil vane 52. More specifically, each airfoil trailing edge 106 is spaced chordwise and downstream from each respective airfoil leading edge 104. First and second sidewalls 100 and 102, respectively, also extend longitudinally, or radially outwardly, in span from radially inner band 56 to radially outer band 54.

In the exemplary embodiment, each arcuate nozzle portion 50 includes a pair of circumferentially inner airfoil vanes 110 and 112, and a pair of circumferentially outer airfoil vanes 114 and 116. Inner airfoil vanes 110 and 112 are coupled between outer airfoil vanes 114 and 116 and are spaced a circumferential distance 120 apart. Vanes 110, 112, 114, and 116 are also oriented substantially parallel to each other. Distance 120 and an orientation of vanes 110, 112, 114, and 116 are variably selected to facilitate creating a highly divergent flowpath through nozzle 50, and to facilitate optimizing aerodynamic convergence through nozzle 50.

Vanes 110, 112, 114, and 116 are integrally joined to both inner and outer bands 56 and 54, respectively. Specifically, each vane 52 is coupled to inner band 56 by a single radii fillet 130 that circumscribes each vane 52 and—smoothly transitions between each respective vane 110, 112, 114, and 116 and inner band 56. Each inner airfoil vane 110 and 112 is also coupled to outer band 54 by a single radii fillet 132 that that circumscribes each vane 110 and 112, and smoothly transitions between each respective vane 110 and 112 and outer band 54.

Each outer airfoil vane 114 and 116 are coupled to outer band 54 by a compound radii fillet 140 and by a single radii fillet 142. Specifically, each single radii fillet 142 is positioned between respective circumferentially inner vane 110 and 112, and each respective outer airfoil vane 114 and 116. More specifically, the single radii fillet 142 transitioning between airfoil vane 114 and outer band 54 extends only along the suction side of airfoil vane 114, and the compound radii fillet 140 transitioning between airfoil vane 114 and outer band 54 extends only along the pressure side of airfoil vane 114. Similarly, the single radii fillet 142 transitioning between airfoil vane 116 and outer band 54 extends only along the pressure side of airfoil vane 116, and the compound radii fillet 140 transitioning between airfoil vane 116 and outer band 54 extends only along the suction side of airfoil vane 116.

Each compound radii fillet 140 includes a first radius R1 and a second radius R2. Specifically, first radius R1 is smaller than second radius R2, and extends between second radius R2 and outer band 54. More specifically, second radius R2 extends from an outer surface 150 of each respective airfoil 114 and 116 and transitions to first radius R1, such that first radius R1 blends smoothly into an inner surface 152 of outer band 54.

During operation, as hot combustion gases flow through nozzle 50, because airfoil vanes 52 are formed integrally with outer and inner bands 54 and 56, respectively, temperature gradients and aerodynamic loading may result in thermal stresses and thermal chording between airfoil vanes 52 and outer band 54. However, compound radii fillets 140 facilitate reducing local thermal stresses between vanes 52 and outer band 54. Furthermore, because compound radii fillets 140 do not circumscribe each outer airfoil vane 114 and 116, and because inner airfoil vanes 110 and 112 do not include compound radii fillets 140, impact on aerodynamic convergence through nozzle 50 is facilitated to be minimized. More specifically, because each single radii fillet 142 is smaller in size than a compound radii fillet 140, single radii fillets 142 are less restrictive of the aerodynamic passage through nozzle 50. As a result, compound radii fillets 140 facilitate increasing the durability of nozzle 50 and extending a useful life of nozzle 50.

In an alternative embodiment, nozzle 50 is a cantilever mounting arrangement, inner band 56 is free to move radially and axially, and outer band 54 is only constrained by hook assemblies 74 and 76. During operation, higher stresses are induced between outer band 54 and airfoil vanes 52, and as described above, all of the inner band and airfoil vane interfaces use a simple single radii fillet 130. Compound radii fillets 140 are only used along the extreme circumferential outer edges of the outer band and airfoil vane interfaces. If desirable, in this embodiment, and in the others described, additional compound radii fillets 140 may be progressively extended towards a circumferential center of the multi airfoil vane segment.

The above-described turbine nozzle includes a pair of outer airfoil vanes that each include a compound radii fillet that extends along only one side of each airfoil vane. Inner airfoil vanes do not include a compound radii fillet are and coupled to the outer band with a conventional single radii fillet. The compound radii fillets reduce stress concentrations induced within the turbine nozzle without adversely impacting aerodynamic convergence through the turbine nozzle. As a result, the durability and useful life of the turbine nozzle are facilitated to be increased by the compound radii.

Exemplary embodiments of turbine nozzles are described above in detail. The nozzles are not limited to the specific embodiments described herein, but rather, components of each turbine nozzle may be utilized independently and separately from other components described herein.

While the invention has been described in terms of various specific embodiments, those skilled in the art will recognize that the invention can be practiced with modification within the spirit and scope of the claims.

What is claimed is:

1. A method for fabricating a turbine nozzle for a gas turbine engine, said method comprising:

providing a turbine nozzle including a plurality of airfoil vanes extending between an inner band and an outer band; and forming a compound radii fillet extending between a first of the airfoil vanes and the outer band, such that at least a second of the airfoil vanes is coupled to the outer band by only a single radii fillet.

2. A method in accordance with claim 1 wherein said forming a compound radii fillet comprises forming a compound radii fillet including only a first radius and a second radius, wherein the first radius is larger than the second radius.

3. A method in accordance with claim 2 wherein said forming a compound radii fillet comprises forming the compound radii fillet such that the second radius extends between the first radius and the outer band.

4. A method in accordance with claim 1 wherein each of the plurality of airfoil vanes include a first sidewall and a second sidewall connected at a leading edge and a trailing edge, said forming a compound radii fillet comprises forming a compound radii fillet that extends along only one of the first airfoil sidewalls.

5. A method in accordance with claim 4 wherein the plurality of airfoil vanes further includes at least a third airfoil vane coupled to the inner and outer bands such that the second airfoil vane is between the first and third airfoil vanes, said forming a compound radii fillet further comprises:

forming a second compound radii fillet that extends along only one of the third airfoil sidewalls.

6. A turbine nozzle for a gas turbine engine, said nozzle comprising:

an outer band;

an inner band; and a plurality of airfoil vanes coupled together by said outer band and said inner band, said plurality of airfoil vanes comprising at least a first airfoil vane and a second airfoil vane, said first airfoil vane comprising a compound radii fillet extending between said outer band and said first airfoil vane, said second airfoil vane coupled to said outer band only by a single radii fillet.

7. A turbine nozzle in accordance with claim 6 wherein said compound radii fillet comprises only a first radius and a second radius, said first radius larger than said second radius.

8. A turbine nozzle in accordance with claim 7 wherein said second radius is between said first radius and said outer band.

9. A turbine nozzle in accordance with claim 6 wherein said compound radii fillet facilitates reducing stress concentrations within said turbine nozzle.

10. A turbine nozzle in accordance with claim 6 wherein said plurality of airfoil vanes each comprise a first sidewall and a second sidewall connected at a leading edge and a trailing edge, said compound radii fillet extending along only one of said first airfoil vane first and second sidewalls.

11. A turbine nozzle in accordance with claim 6 wherein said plurality of airfoil vanes further comprises a third airfoil vane, said second airfoil vane coupled within said turbine nozzle between said first and third airfoil vanes, said third airfoil vane coupled to said outer band by a second compound radii fillet.

12. A turbine nozzle in accordance with claim 11 wherein said plurality of airfoil vanes each comprise a first sidewall and a second sidewall connected at a leading edge and a trailing edge, said compound radii fillets extending only along said first airfoil vane first sidewall and said third airfoil vane second sidewall.

13. A turbine nozzle in accordance with claim 6 wherein each said plurality of airfoil vanes is coupled to said inner band by a single radii fillet.

14. A gas turbine engine comprising at least one turbine nozzle assembly comprising an outer band, an inner band, and a plurality of airfoil vanes coupled together by said outer and inner bands, said plurality of airfoil vanes comprising a first airfoil vane and a second airfoil vane positioned circumferentially adjacent said first airfoil vane, said first airfoil vane comprising at least one compound radii fillet extending between said first airfoil vane and said outer band, said second airfoil vane comprising only a single radii fillet extending between said outer band and said second airfoil vane.

15. A gas turbine engine in accordance with claim 14 wherein said first airfoil vane compound radii fillet facilitates reducing stress concentrations within said turbine nozzle.

16. A gas turbine engine in accordance with claim 15 wherein said plurality of airfoil vanes each comprise a first sidewall and a second sidewall connected at a leading edge and a trailing edge, said compound radii fillet extending along only one of said first airfoil vane first and second sidewalls.

17. A gas turbine engine in accordance with claim 15 wherein said first airfoil vane compound radii fillet comprises only a first radius and a second radius, said first radius larger than said second radius.

18. A gas turbine engine in accordance with claim 17 wherein said compound radii second radius is between said compound radii first radius and said outer band.

19. A gas turbine engine in accordance with claim 17 wherein said plurality of airfoil vanes each comprise a first sidewall and a second sidewall connected at a leading edge and a trailing edge, said first airfoil vane compound radii fillet extending along only one of said first airfoil vane first and second sidewalls.

20. A turbine nozzle in accordance with claim 15 wherein said plurality of airfoil vanes further comprises a third airfoil vane and a fourth airfoil vane, said second and third airfoil vanes coupled within said turbine nozzle between said first and fourth airfoil vanes, said fourth airfoil vane also coupled to said outer band by a compound radii fillet.

* * * * *